Dec. 25, 1945.    E. S. KLEINHANS ET AL    2,391,838
AIR CONDITIONING SYSTEM
Filed June 19, 1944    4 Sheets-Sheet 4
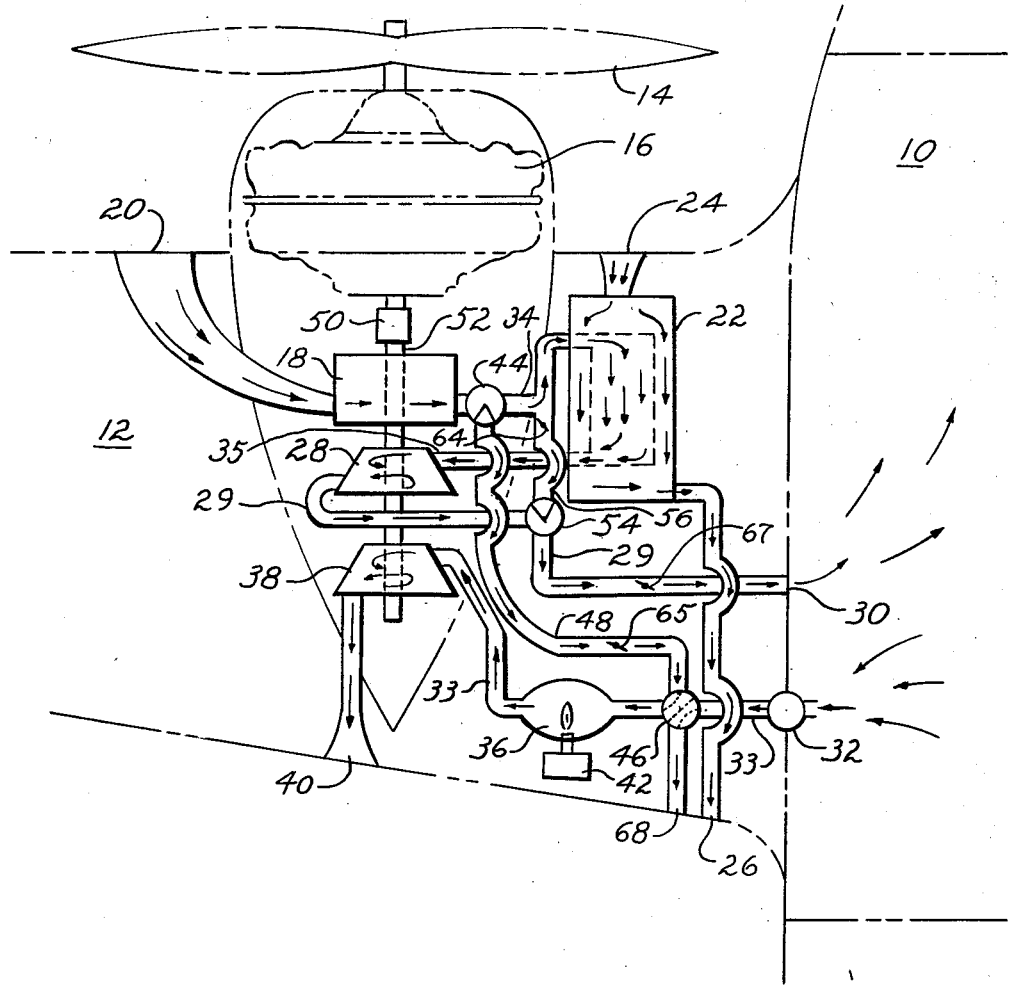
INVENTORS:
EARL S. KLEINHANS AND
WILBUR W. REASER
BY J. Edwin Coates
ATTORNEY Patented Dec. 25, 1945

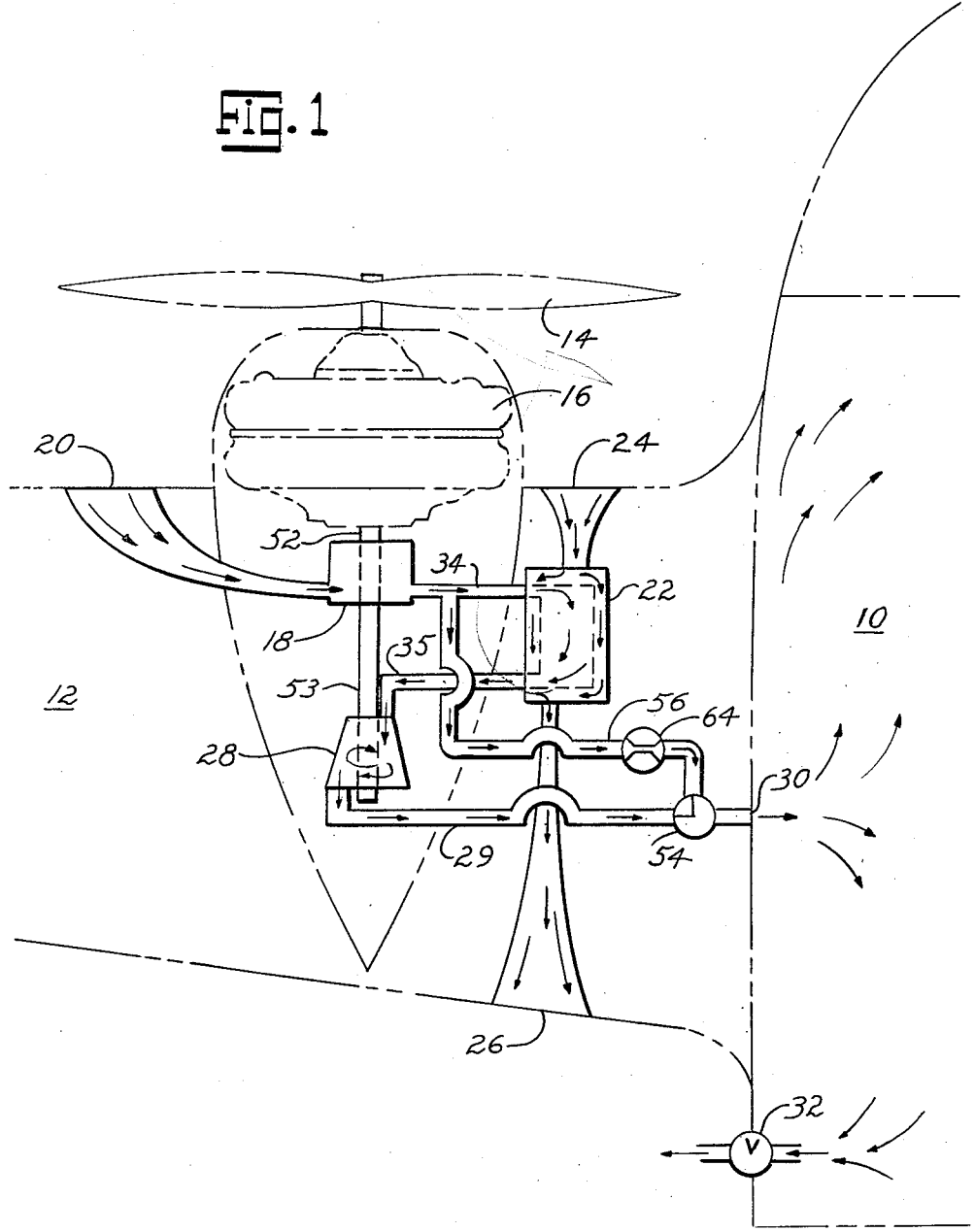

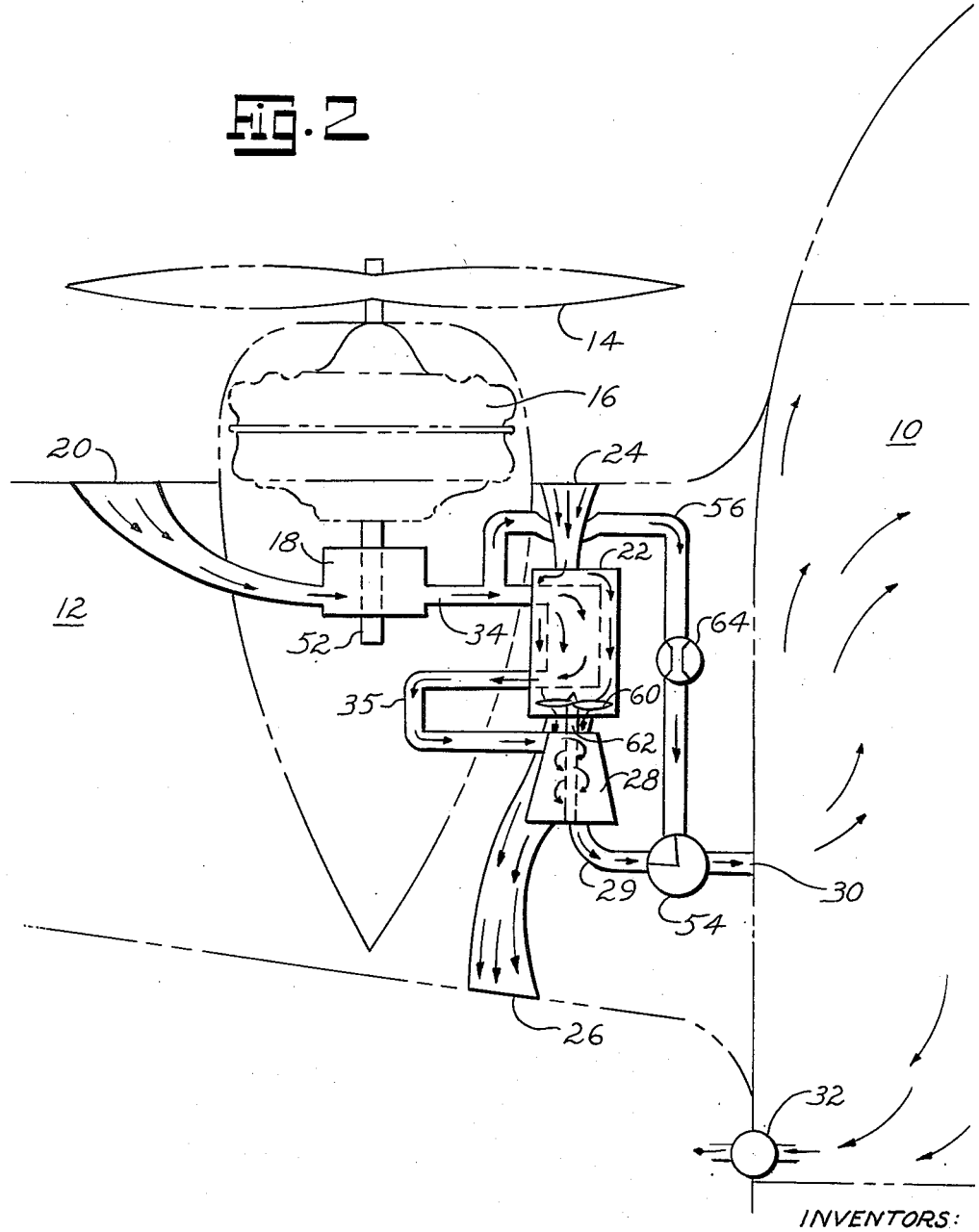

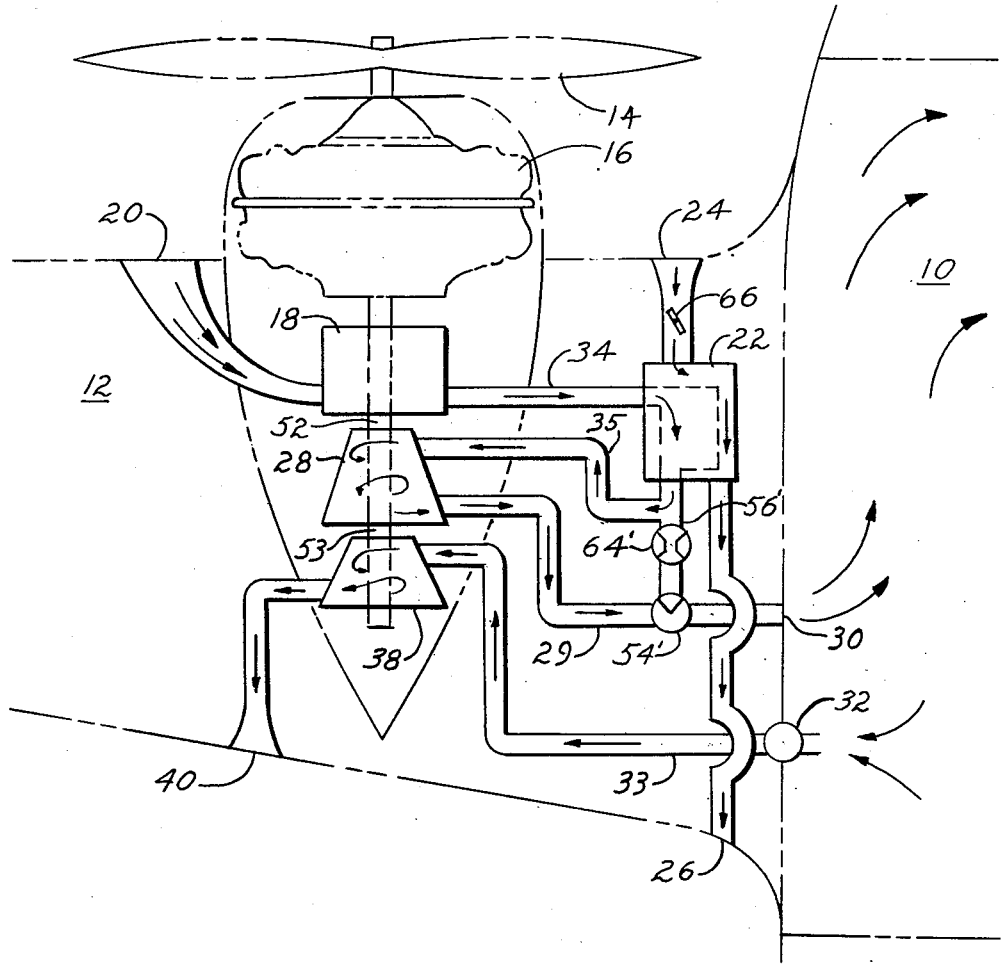

2,391,838

UNITED STATES PATENT OFFICE 2,391,838

AIR CONDITIONING SYSTEM

Earl Schuyler Kleinhans, Santa Monica, and Wilbur W. Reaser, Pacific Palisades, Calif., assignors to Douglas Aircraft Company, Inc., Santa Monica, Calif.

Application June 19, 1944, Serial No. 541,029

15 Claims. (Cl. 257—9)

This invention relates to an air pressure system for air sealed livable compartments or rooms and is particularly adapted for use in aircraft cabins to provide air for the cabin occupants at a hygienic pressure when the aircraft is at high altitudes of low atmospheric pressure.

It is common practice to use air compressors powered usually by an aircraft propeller engine to supply the cabin of an aircraft with air at pressures greater than the surrounding atmosphere at high altitudes. One of the principal problems in the development of cabin pressure systems has been that of regulation of the pressure and temperature of the air in the cabin.

The high pressure air leaving the compressor is a source of potential energy relative to the low pressure air of the ambient atmosphere. Also the airstream as it passes through the compressor from the ambient atmosphere is elevated in temperature in accordance with the thermodynamic principle that some of the energy put into the airstream by the compressor is unavoidably converted into heat, the balance of the input energy being represented in increased pressure. As will be later discussed, this addition of heat to the airstream may be put to beneficial use in regulating the temperature of the cabin air to a degree comfortable to the cabin occupants. The higher temperature of the compressed air and its higher pressure are both sources of potential energy relative to the pressure and temperature levels of the ambient atmosphere.

One object of the invention is the recovery of this potential energy for beneficial use, such as to furnish a part of the power required to drive the compressor.

Since under usual conditions the elevation of the air temperature in the compressor may be so great as to warm the cabin air above the comfort level, some means must be provided for cooling the airstream between the compressor and cabin. In its most practical form this cooling means is a heat interchanger in which the coolant medium is a second airstream conducted from the ambient atmosphere through the interchanger to an exhaust duct leading back to the ambient atmosphere. To render such an interchanger more effective a fan may be disposed along the coolant airstream to increase the rate of heat transfer from the cabin airstream. Another object of this invention is to recover the potential energy of the cabin airstream for use in driving a fan disposed along the coolant airstream.

More specifically it is an object of the invention to recover the potential energy of the cabin exhaust airstream after it has served its purpose of supplying the cabin occupants with air at hygienic pressure, and utilize the recovered energy in the driving of the compressor.

Another object of the invention is to provide from the cabin exhaust stream all the power for driving the compressor by adding heat energy to the exhaust airstream between the cabin outlet and the energy recovering device at a rate such that the exhaust airstream alone has enough power to drive the compressor.

Obviously such a system for driving the compressor is not self starting. It is therefore still another object of the invention to provide in such a system a starting means whereby an aircraft engine or other power source initially drives the compressor to build up air pressure in the system and is thereafter disconnected to allow the exhaust airstream to drive the compressor.

It is another object of the invention to provide a system with such a starting power arrangement, in which the exhaust air stream is rapidly brought up to a pressure at which, with the addition of heat energy, it possesses sufficient potential energy to drive the compressor. This object is accomplished by initially bypassing the cabin with the airstream and conducting the air directly from the compressor to the energy recovering device for a brief time interval after the starting power is applied.

Reference has been made to a heat interchanger employing outside air as a coolant fluid, for reducing the temperature of the compressed air to a comfort level. Under some conditions the outside air is not sufficiently cold to accomplish this object. It is another object of the invention to overcome this difficulty. This object is fulfilled by operating the compressor to raise the pressure of the cabin airstream to a value above the hygienic level, lowering the temperature in the heat interchanger to the extent permitted by the temperature of the coolant airstream, and then passing the cabin airstream through an expansion turbine in which its pressure is brought to the desired cabin value and its temperature simultaneously reduced to a degree suitable to the comfort of the cabin occupants.

It is also an object of the invention to utilize the power delivered by such an expansion turbine for a beneficial purpose, such as providing some of the power for driving the compressor, or providing power for driving a fan to increase the airflow speed of the coolant air through the interchanger.

It is still another object of the invention to provide, in a cabin supercharging system in which a heat interchanger and an expansion turbine are used in series combination along the air duct to regulate the temperature of the supercharged air, means for regulating the airstream to any desired degree of temperature to compensate for varying temperature values of the ambient air. This object is accomplished by including in the system an air duct bypassing the interchanger and expansion turbine, whereby warm air from the compressor may be led directly to the cabin inlet duct and there mixed in any desired proportion with the airstream passing through the interchanger and turbine, these latter devices being adjusted and arranged to cool the air sufficiently under the most extreme high temperature conditions of the ambient air. This bypassing duct is thus used to compensate for overcooling of the cabin air by coolant air of unduly low temperature. The regulation of the temperature of the cabin air passed through the heat interchanger may also be accomplished under varying atmospheric temperature conditions by regulation of the flow rate of the coolant air by means of a suitable valve device in the coolant air duct or by means of a variable speed fan in the coolant air duct or by adding heat to the airstream.

Figure 1 is a schematic plan view of a portion of an airplane, showing a fuselage, wing, and conventional power plant in phantom lines and diagrammatically illustrating a cabin pressure system embodying one form of the invention in solid lines.

Figures 2, 3, and 4 are views similar to Figure 1, illustrating diagrammatically different forms of the invention shown in Figure 1.

Like reference characters on the various figures indicate similar elements of the systems illustrated.

In the embodiment of the invention shown in Figure 1, a portion of an aircraft cabin outlined in broken lines is indicated at 10. A conventional wing 12 is attached to the fuselage at the cabin station. Propeller 14 driven by a power plant 16 is mounted on the wing. The cabin pressure system is illustrated as being located in the wing and in the nacelle for simplicity, but obviously many changes may be made in the arrangement and location of its elements.

Ambient atmosphere air is supplied to an air compressor 18 through an intake air duct 20 located in the leading edge of wing 12. Compressor 18 is driven by engine 16 through drive shaft 52 by means of suitable variable speed mechanism. The air compressed in the compressor 18 flows through a duct 34 to a heat exchanger 22. Coolant air is supplied to the heat exchanger from the outside atmosphere through an intake duct 24 positioned to receive air from the forward edge of the wing under the pressure head caused by the forward motion of the wing through the ambient air. After circulation through the heat interchanger, the cooling air leaves the airplane by an outlet duct 26 opening into the atmosphere at the trailing edge of the wing. The compressed cabin airstream leaves the heat interchanger at a temperature necessarily above atmospheric temperature and enters an expansion turbine 28 through duct 35. From the turbine the cabin airstream is led through duct 29 to the cabin 10, entering the cabin through a port 30.

The expansion turbine is used to ensure the air entering the cabin being at a comfortable temperature. The outside air, as has been above stated, may be so warm that the coolant stream can not reduce the temperature of the cabin airstream to a proper level as it passes through the heat interchanger. By following the method of compressing the cabin air to a pressure higher than required for the cabin occupants, then cooling it to the maximum extent possible by the coolant airstream, and finally passing it through the expansion turbine, the compressor, heat interchanger and turbine are used to bring the temperature of the cabin air to a proper degree for comfort, without defeating the purpose of maintaining the air in the cabin at a hygienic pressure value.

Air leaves the cabin through a valve 32 in the cabin wall and is discharged into the ambient atmosphere. The pressure within the cabin is in usual practice manually or automatically regulated to compensate for variations in the atmospheric pressure by changing the opening of the valve 32. The compressor is usually driven at a constant speed. The temperature of the cabin air will fluctuate with changes of atmospheric temperature. The rate of inflow of air into the cabin in response to changes in the outlet valve 32 as the atmospheric pressure changes will also affect the temperature of the cabin air. It is therefore obviously necessary to provide a means for regulation of the temperature of the cabin air, since the system as thus far described will care only for the extreme condition of unusually warm atmospheric air.

To provide for regulating the temperature of the cabin air to accord with changing atmospheric temperature and pressure, a bypass duct 56 leads from duct 34 to duct 29. A three way valve 54 where duct 56 enters duct 29 is adjustable to either close the mouth of duct 56 and open duct 29 or close duct 29 and open the mouth of duct 56, or to mix air in varying proportions through these two ducts for injection into the cabin. As the air in duct 56 comes directly from the compressor, it is at a relatively high temperature and may be used to temper the air passing through the interchanger and turbine to any degree desired for the comfort of the cabin occupants, by adjustment of the valve 54. An adjustable Venturi opening 64 is positioned in the bypassing duct 56 to equalize the pressure drop in this duct with that in the more restricted path of the airstream which flows through the heat interchanger and expansion turbine.

To efficiently use the fuel carried by the aircraft, the turbine 28 is connected by an extension 53 of the drive shaft 52 with the compressor 18, the energy recovered in the turbine from the airstream flowing through ducts 35 and 29 being thus put to a beneficial use in taking part of the work load of the compressor.

In the form of the invention shown in Figure 2, the aircraft parts, the compressor, heat interchanger, turbine, ducts and valves are similar to the corresponding elements shown in Figure 1, and are similarly designated by identifying figures. The turbine 28, however, is not connected by power transmitting means to drive the compressor 18, but is connected by a drive shaft 62 to rotate a fan 60 which is arranged to draw coolant air through the interchanger 22 from duct 24 and into the coolant exhaust duct 26. Under some conditions this arrangement may be preferable to that shown in Figure 1. The cooling effect of the interchanger is increased and the expansion turbine may be of correspondingly less capacity and the delivery pressure of the compressor may be correspondingly lowered, lightening the work load of the compressor. Furthermore, the fan serves to draw cooling air through the heat exchanger when the plane is not moving through the air, and thus permits the system to operate even when the plane is on the ground. This form of the invention also illustrates another means for utilizing the energy recovered from the cabin airstream. Obviously, still other devices on an aircraft may be powered by the expansion turbine.

In the form of the invention shown in Figure 3, the aircraft parts, the compressor, compressor drive, ducts 20 and 34, heat interchanger 22, duct 35, expansion turbine 28, duct 29, coolant ducts 24 and 26, and cabin outlet valve 32 are all similar to the corresponding elements of Figure 1. Instead of the bypass 56 of Figure 1, which bypasses both the heat interchanger and turbine, in the form of the invention shown in Figure 3, a bypass 56' is arranged to connect duct 35 and duct 29, this duct then bypassing the expansion turbine only. Valve 54' and Venturi opening 64' are similarly located to the corresponding elements of the system shown in Figure 1, and function in a similar manner. A throttling valve 66 in the coolant air intake 24 is adjustable to decrease or increase the cooling action of the heat interchanger 22 and the bypass 56' and the adjustable three-way mixing valve 54' are used to modify the cooling effect of the turbine 28. Venturi opening 64' is a further means of providing heated air to the cabin. It may be so regulated as to restrict the flow through the duct, thus building up a back pressure in the system, thereby creating more intense heating of the air in the compression process.

Figure 3 also illustrates additional means for recovering the potential energy imparted to the airstream by the compressor 18. It will be understood that this additional energy recovering device may be used with the forms of the invention shown in Figures 1 and 2, or may be used in a cabin pressure system in which either the heat interchanger or the expansion turbine 28 or both, are omitted from the system. For brevity of disclosure, this additional recovering means is shown in Figure 3 in connection with the disclosure of the coolant throttling valve 66 and bypass 56'.

A second expansion turbine 38 is disposed along a cabin exhaust air duct 33 leading from the cabin outlet valve 32 to the trailing edge of the wing at 40. This turbine 38 may be mounted to drive the shaft 52 to contribute power for the operation of the compressor 18 or it may be connected to drive any other device for the operation of which the nature and pattern of its power delivery is suited.

The form of the invention shown in Figure 4 combines the features of the system of Figure 1 with those of Figure 3 with an additional feature which will presently be explained. The aircraft parts, compressor, heat interchanger, first expansion turbine 28, ducts 20, 34, 35, 29, bypass duct 56 and three-way mixing valve 54 are as shown in Figure 1. Cabin outlet valve 32, exhaust duct 33, second expansion turbine 38 and exhaust duct 40 are as shown in Figure 3. A throttling valve 64 is shown in bypassing duct 56 in lieu of the Venturi opening 64 of Figure 1, although the Venturi opening may be used in the Figure 4 system if desired. A shut off valve 67 is shown in that portion of duct 29 between mixing valve 54 and cabin inlet opening 30 to permit the cabin pressure to be equalized with external pressure without stopping the compressor when the aircraft is at low altitudes or at a landing station, the reason for which will presently appear.

The cabin exhaust airstream in duct 33 is heated in a heating chamber 36 by a burner 42 supplied with a combustible gas from a storage tank (not shown) on the aircraft. Any other suitable source of heat may of course be utilized in lieu of the gas burner, as for instance an electric heating coil supplied with current from the electric system of the aircraft. The additional energy thus put into the exhaust airstream augments the power taken from the airstream by the expansion turbine 38 sufficiently to drive the compressor 18 without the use of the aircraft engine 16 and with or without the use of the first expansion turbine 28.

Obviously such a system is not self-starting. Accordingly the compressor is initially powered from the aircraft engine or other power source through a disconnectible clutch 50. This clutch may be manually operated or may be of the overrunning type in which case it will become automatically disconnected from the initial source of power when the turbine 38 or turbines 38 and 28 develop sufficient power to carry the full load and operate the compressor at full speed.

That the source of starting power may be utilized to a minimum extent for a minimum starting period, a bypass duct 48 is provided connecting the dust 34 with the exhaust duct 33. A four-way valve 46 at the junction of duct 48 with duct 33 makes it possible to take air directly from the compressor 18 to the combustion chamber 36 through the bypass duct 48 and at the same time connect the upstream end of duct 33 with the outside air through a duct 68 or to shut off ducts 48 and 68 and connect the upstream end of duct 33 with the combustion chamber 36. When starting the compressor, valve 46 is placed to connect duct 48 with the combustion chamber, enabling the compressor to feed power directly to the turbine 38 without loss of pressure energy in the interchanger, turbine 28 and cabin. As soon as the turbine 38 is developing sufficient power from the exhaust airstream the valve 46 may be gradually turned until all of the airstream is passing through the cabin and the bypass 48 is completely closed.

The bypass duct 48 is equipped with a variable pressure valve 65. The valve may comprise any conventional throttle valve such as the butterfly valve shown, and can be controlled through any desired pressure responsive mechanism commonly used today. It will be seen that the position of the valve 65 can be adjusted to equalize the pressure drop in the bypass duct 48 and in the duct circuit comprising the heat interchanger, the turbine 28 and the cabin, when the air flow is divided between the bypass duct and the cabin circuit. A three-way valve 44 at the upstream end of the bypass duct 48 makes it possible to thus divide the flow. By properly adjusting this valve and at the same time turning valve 46 to connect the bypass with the downstream end of duct 33, and to connect the cabin through outlet valve 32 to exhaust duct 68, the system will be self powered with a relatively small addition of heat energy in the combustion chamber 36, and the portion of the airflow which passes through the heat interchanger will supply the cabin with air at proper pressure and temperature, this air being exhausted through duct 68. This adjustment of the system is of value at relatively low altitudes of relatively high atmospheric pressure, since under these conditions the potential energy of the cabin exhaust is small and of little value in operating the turbine 38 and may well be exhausted directly into duct 68. Thus the system is self powered under these conditions with a small addition of heat energy in the combustion chamber. At high altitudes the same small addition of heat energy is sufficient because then the cabin air has sufficient potential energy to supply the balance of the power to operate the compressor. Floating the cabin on the self powering bypass line makes it possible to design the system to work under widely varying conditions with a relatively small rate of heat supply in the combustion chamber.

The invention is not confined to any one of the specific disclosures made herein, but is defined in and has the scope of the following claims.

We claim:

1. In a pressure system for an aircraft the combination of: an air compressor; an intake to the compressor from the ambient atmosphere; a discharge conduit system leading from the compressor to the ambient atmosphere including an inlet air duct to the cabin of the aircraft and an outlet duct from the cabin to the ambient atmosphere; a heat interchanger in the inlet duct; means for supplying a coolant fluid to the interchanger; an expansion turbine in said inlet duct intermediate said heat interchanger and said cabin; a second expansion turbine in said outlet duct; and means for delivering the power generated in both turbines to said compressor.

2. In a pressure cabin system for an aircraft the combination of: an air compressor; an intake to the compressor from the ambient atmosphere; an expansion turbine; conduit means for delivering air from the compressor to the turbine; an inlet air duct to the cabin; conduit means for delivering air from the turbine to the inlet duct; a second expansion turbine; conduit means for delivering air from said cabin to said second turbine; and a power transmitting means for delivering the power generated in both expansion turbines for the operation of the said compressor.

3. In a pressure system for an aircraft the combination of: an air compressor; an intake to the compressor from the ambient atmosphere; a discharge conduit system leading from the compressor to the ambient atmosphere, including an inlet air duct to the cabin and an outlet duct from the cabin to the ambient atmosphere; an expansion turbine connected into said inlet duct; a turbine by-passing duct for said inlet duct; a three-way valve at the down-stream end of said by-passing duct for either selectively closing the by-passing duct or the portion of the inlet duct into which said turbine is connected, or mixing incoming air from said ducts in variable proportions; an adjustable pressure regulating device in said by-passing duct for controlling the pressure in said by-passing duct; an expansion turbine connected into said outlet duct; and means for utilizing the power generated in both turbines to operate said air compressor.

4. In a pressure cabin system for an aircraft the combination of: an air compressor; an intake to the compressor from the ambient atmosphere; an expansion turbine; conduit means leading from the compressor to the turbine; an inlet air duct to the cabin; conduit means for delivering air from the turbine to the inlet duct; conduit means interconnecting the conduit means leading from the compressor and the conduit means delivering air from the turbine to said inlet duct; valve means in said last named conduit means for selectively varying from zero to maximum flow the air delivered to said turbine whereby the air delivered by said compressor can be directed in varying percentages to either the turbine or to said cabin; a second expansion turbine; conduit means for delivering air from said cabin to said second turbine; and a power transmitting means for delivering the power generated in both expansion turbines for the operation of the said compressor.

5. In a pressure cabin system for an aircraft the combination of: an air compressor; an intake to the compressor from the ambient atmosphere; an expansion turbine; conduit means for delivering air from the compressor to the turbine; an inlet air duct to the cabin; conduit means for delivering air from the turbine to the inlet duct; conduit means interconnecting the conduit means leading from the compressor and the conduit means delivering air from the turbine to said inlet duct whereby air from said compressor can by-pass said turbine for direct delivery to said inlet duct; valve means at the jointure between the said by-pass conduit means and the conduit means delivering air from said turbine for selectively closing either the conduit means between the turbine and inlet duct or the by-pass conduit means, said valve means being so constructed and arranged as to partially restrict flow of air in both conduits; a second expansion turbine; conduit means for delivering air from said cabin to said second turbine; and a power transmitting means for delivering the power generated in both expansion turbines for the operation of the said compressor.

6. In a pressure system for an aircraft the combination of: an air compressor; an intake to the compressor from the ambient atmosphere; a discharge conduit system leading from the compressor to the ambient atmosphere including an inlet air duct to the cabin of the aircraft and an outlet duct from the cabin to the ambient atmosphere; a heat interchanger in the inlet duct; means for supplying a coolant fluid to the interchanger; an expansion turbine in said inlet duct intermediate said heat interchanger and said cabin; conduit means leading from said heat interchanger to said inlet air duct; valve means in said conduit means for selectively varying from zero to maximum the air flowing through said turbine and conduit means whereby the air from said interchanger can be caused to by-pass said turbine for delivery directly to said cabin; a second expansion turbine in said outlet duct; and means for delivering the power generated in both turbines to said compressor.

7. The combination defined in claim 1, and in addition thereto: a source of heat arranged to add heat energy to the airstream at a locus along said outlet duct upstream from said turbine, and at a rate sufficient to drive said compressor at a predetermined speed under full cabin supercharging load.

8. The combination defined in claim 1, and in addition thereto: a source of heat arranged to add heat energy to the airstream at a locus along said outlet duct upstream from said turbine at a rate sufficient to drive said compressor under full cabin supercharging load; and power-transmitting means for connecting said compressor to an engine of the aircraft.

9. The combination defined in claim 1, and in addition thereto: a source of heat arranged to add heat energy to the airstream at a locus along said outlet duct upstream from said turbine at a rate sufficient to drive said compressor at a predetermined speed under full cabin supercharging load; and power-transmitting means for connecting said compressor to an engine of the aircraft, said last mentioned power-transmitting means being automatically disconnectible when the compressor is being driven above said predetermined speed by said turbine.

10. In a pressure cabin system for an aircraft, the combination of: an air compressor; an intake to the compresor from the ambient atmosphere; a discharge conduit system leading from the compressor to the ambient atmosphere including an inlet air duct to the cabin and an outlet duct from the cabin to the ambient atmosphere; an expansion turbine immediately upstream from the discharge opening of said system; power-transmitting means connecting the turbine and the compressor; a source of heat arranged to deliver heat energy to the airstream in the discharge conduit system at a locus immediately upstream from said turbine and at a rate sufficient to drive said compressor under full cabin supercharging load; and power means other than said turbine connectible for starting said compressor and disconnectible for the operation of said compressor solely by said turbine.

11. The combination defined in claim 10 in which said conduit system includes a cabin-bypassing, valved, air duct connecting said inlet duct to said outlet duct upstream from said locus.

12. The combination defined in claim 10 in which said discharge conduit system includes a bypass duct having a shut-off valve and leading from said inlet duct to the said locus and having a variable pressure drop valve; a three way valve for dividing the airstream in any desired proportion between said bypass duct and said inlet duct; and means for venting the cabin air from said outlet duct directly into the atmosphere when said shut-off valve is in the open position.

13. The combination defined in claim 1, and in addition thereto: power-transmitting means connecting the compressor to an engine of the aircraft; an interchanger bypassing duct leading from the inlet duct upstream from the interchanger to the inlet duct downstream from the turbine; a three way valve at the downstream end of the bypassing duct for either selectively closing the bypassing duct or the upstream three way valve port of the inlet duct or mixing incoming air from said ducts in variable proportions; an adjustable pressure regulating device in said bypassing duct for controlling the pressure in said bypassing duct at said three way valve; a control valve in said outlet duct; a second expansion turbine in said outlet duct downstream from said control valve; and power-transmitting means connecting said second turbine with said compressor.

14. The combination defined in claim 1, and in addition thereto: an airflow control valve in said coolant intake and discharge means; power transmitting means for delivering the power generated in the turbine for the operation of the compressor; power-transmitting means connecting the compressor to an engine of the aircraft; an interchanger bypassing air duct leading from the inlet duct upstream from the interchanger to the inlet duct downstream from the turbine; a three way valve at the downstream end of the bypassing duct for either selectively closing the bypassing duct or the upstream three way valve port of the inlet duct or mixing incoming air from said ducts in variable proportions; an adjustable pressure regulating device in said bypassing duct for controlling the pressure in said bypassing duct at said three way valve; a control valve in said outlet duct; a second expansion turbine in said outlet duct downstream from said control valve; and power-transmitting means connecting said second turbine with said compressor.

15. The combination defined in claim 1 and in addition thereto; power-transmitting means for delivering the power generated in the turbine for the operation of the compressor; power-transmitting means connecting the compressor to an engine of the aircraft; a control valve in said outlet duct; a second expansion turbine in said outlet duct downstream from said control valve; a source of heat arranged to deliver heat energy to the airstream at a locus along said outlet duct downstream from said control valve and upstream from said second turbine; and at a rate sufficient to drive said compressor at a predetermined speed under full cabin supercharging load; power-transmitting means connecting said second turbine to said compressor; an interchanger bypassing duct leading from the inlet duct upstream from the interchanger to the inlet duct downstream from the first turbine; a three way valve at the downstream end of the bypassing duct for either selectively closing the bypassing duct or the upstream three way valve port of the inlet duct or mixing incoming air from said ducts in variable proportions; a second bypassing valved duct leading from the inlet duct upstream from the upstream end of the first bypassing duct to the outlet duct downstream from said control valve and upstream from said locus; and a variable pressure drop valve in said second bypassing duct.

EARL SCHUYLER KLEINHANS.
WILBUR W. REASER.